United States Patent [19]

Hicks

[11] Patent Number: 5,101,300
[45] Date of Patent: Mar. 31, 1992

[54] MAGNIFIER READER APPARATUS

[76] Inventor: Jonathan Hicks, 4170 3rd Ave., Los Angeles, Calif. 90008

[21] Appl. No.: 644,280

[22] Filed: Jan. 22, 1991

[51] Int. Cl.⁵ .............................................. E02B 27/02
[52] U.S. Cl. ................................... 359/802; 359/806
[58] Field of Search ................................ 350/235–251, 350/582, 589; 40/361–367, 377–384, 388–405; 248/444.1–472, 548, 549, 688–693, 915–924; 359/798–810, 827, 829, 830

[56] References Cited

U.S. PATENT DOCUMENTS

| | | | |
|---|---|---|---|
| 1,264,267 | 4/1918 | Bugbee | 350/250 |
| 1,886,747 | 11/1932 | Schroder | 350/250 |
| 2,550,799 | 5/1951 | Fuller | 350/241 |
| 2,859,548 | 11/1958 | Pruner | 350/241 |
| 3,409,347 | 11/1968 | Vogel | 350/250 |
| 3,707,052 | 12/1972 | Clark | 350/238 |
| 4,530,570 | 7/1985 | Vitrac | 350/241 |
| 4,549,785 | 10/1985 | Vitrac | 350/250 |
| 4,805,680 | 2/1989 | Ueno | 350/243 |
| 4,865,191 | 9/1989 | Easter | 350/582 |
| 4,940,311 | 7/1990 | Buszek et al. | 350/245 |

FOREIGN PATENT DOCUMENTS 221200 4/1910 Fed. Rep. of Germany ...... 350/248

OTHER PUBLICATIONS

Micro-Reader: A New Streamlined Tool for Data Reduction-Model "F"-Opta-Vue-Optics Manufacturing Corp.

Primary Examiner—Bruce Y. Arnold
Assistant Examiner—Thong Nguyen
Attorney, Agent, or Firm—Leon Gilden

[57] ABSTRACT

Apparatus including a central housing plate with a floor plate mounted thereunder to define a slot therebetween. The housing plate includes an annular opening with a convex magnification lens mounted thereon to receive a lotto ticket through the slot permitting ease of reading of the lotto ticket. The invention may further include a plurality of straps positioned at forward and rear end portions about the housing plate to secure a stack of lotto tickets thereunder for storage and transport thereof.

2 Claims, 4 Drawing Sheets

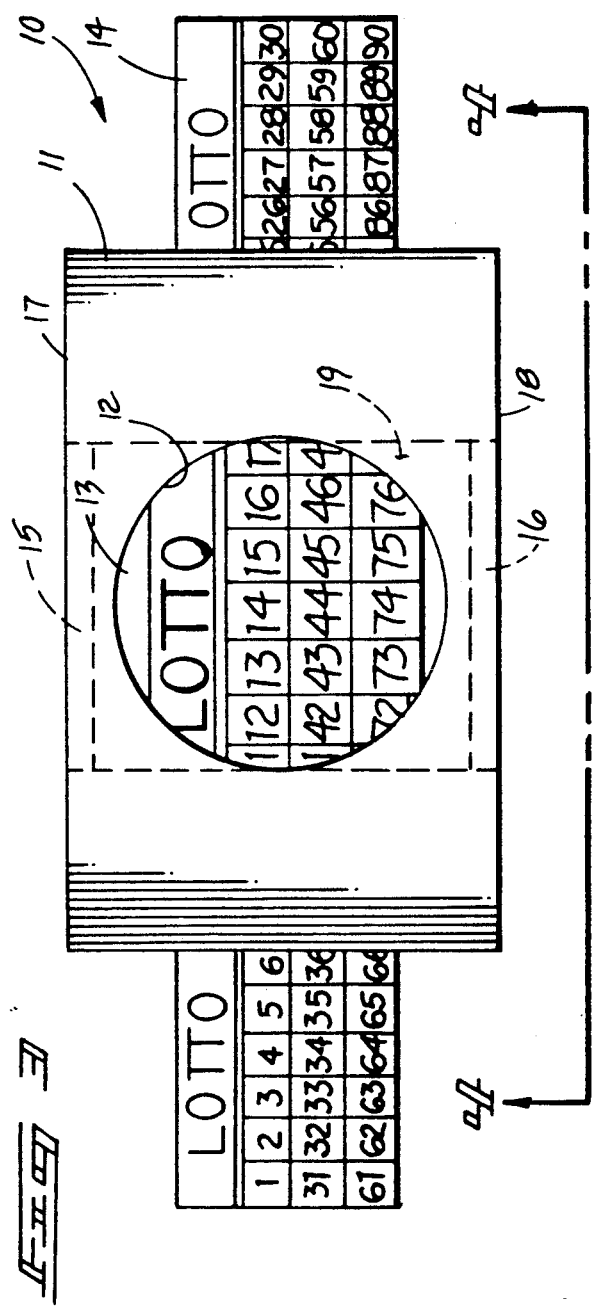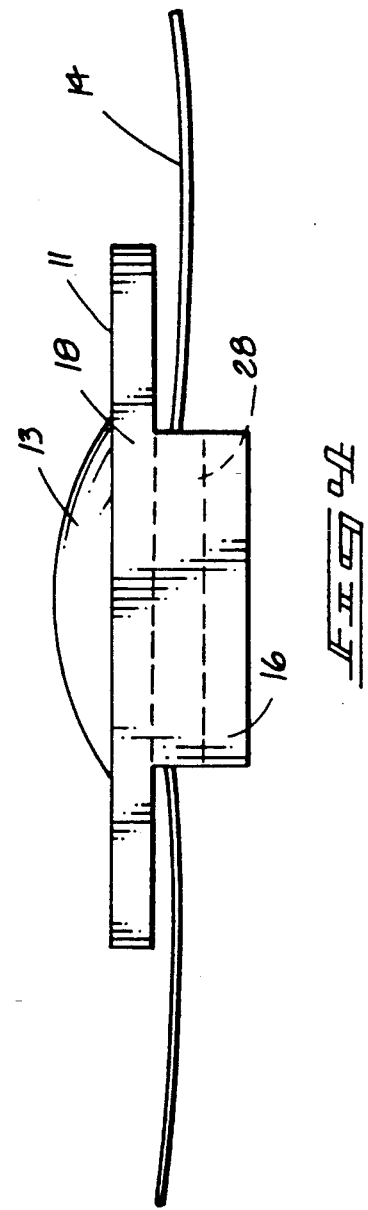

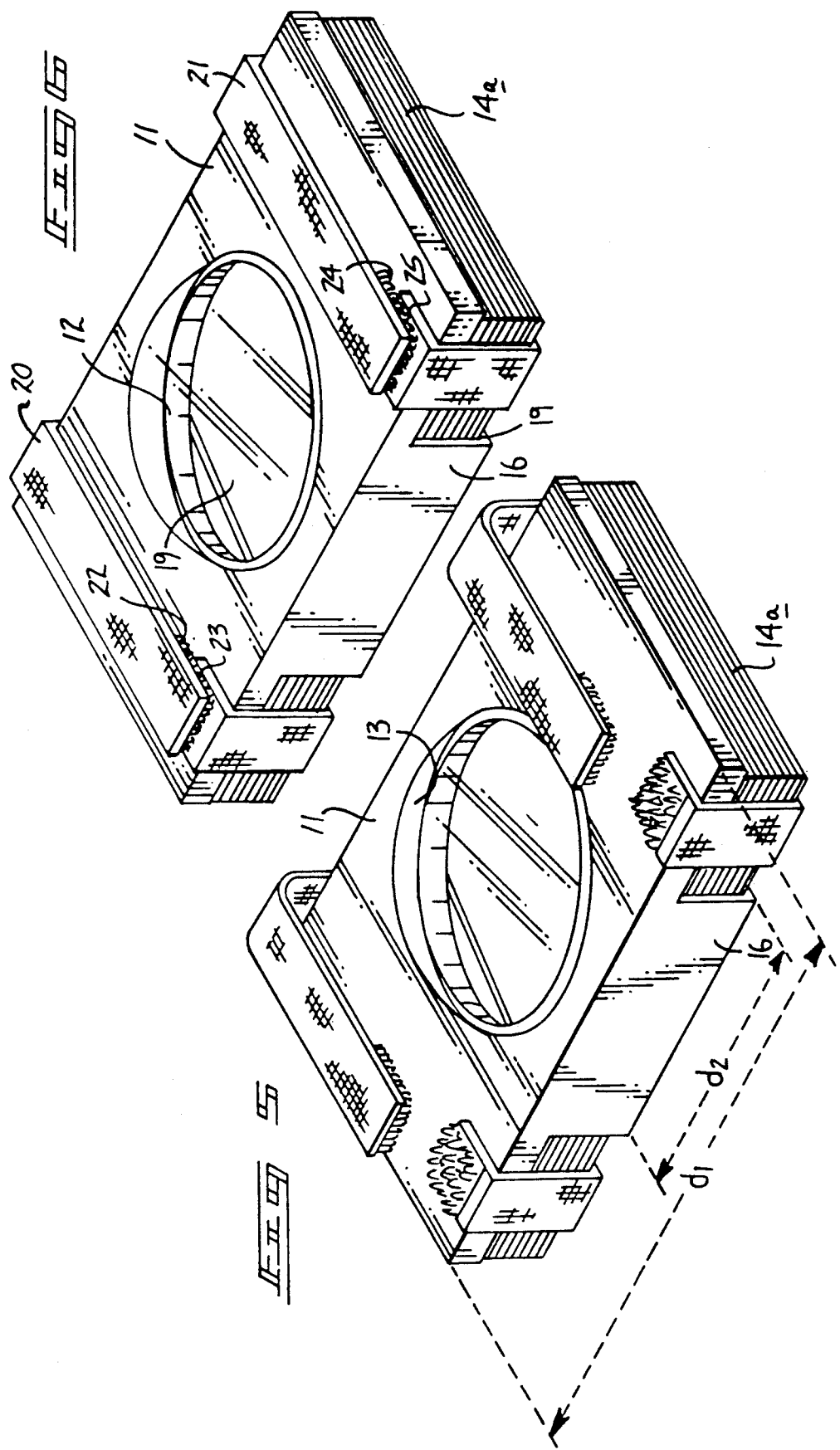

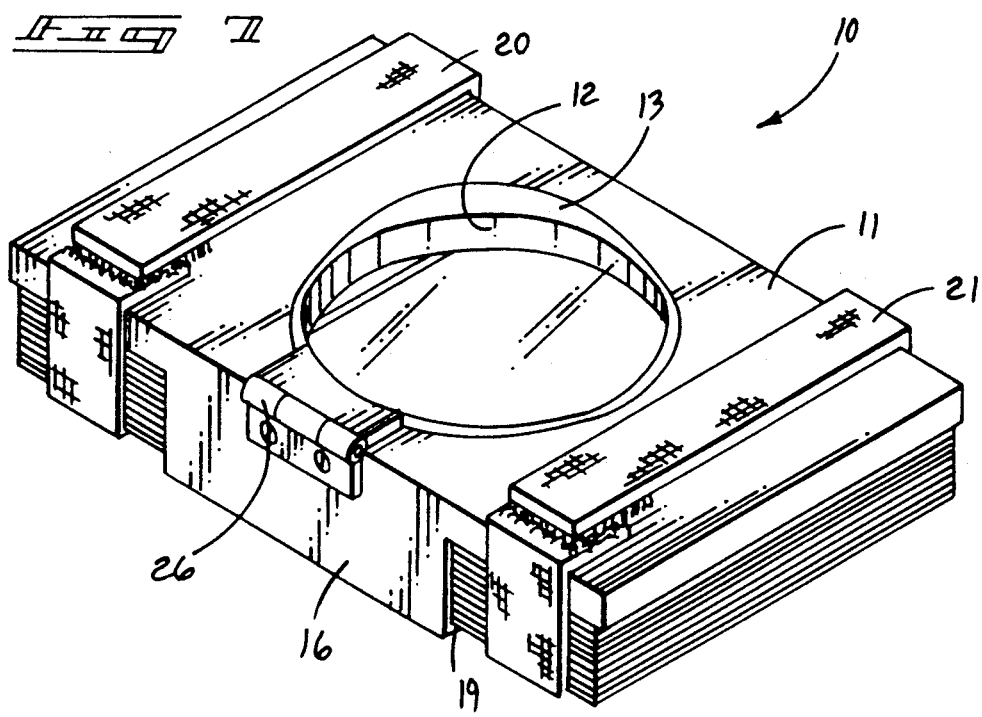
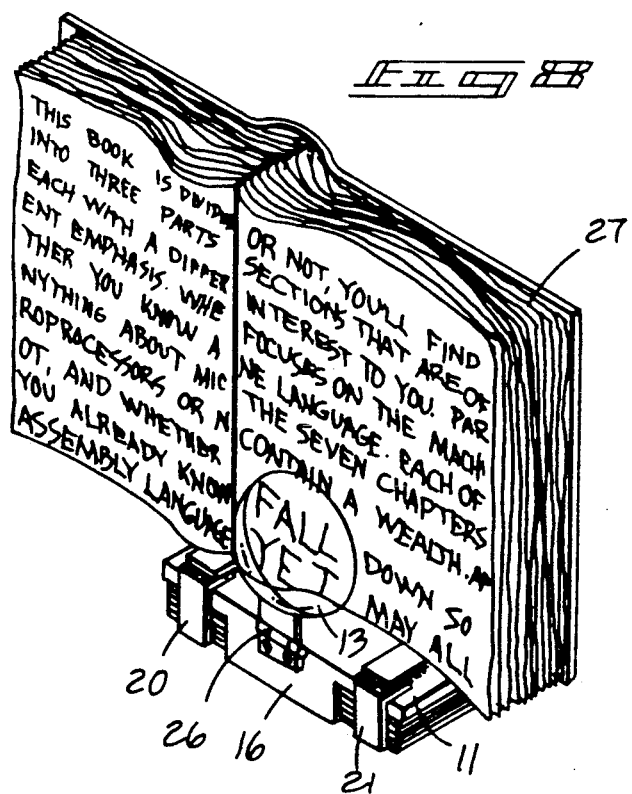

MAGNIFIER READER APPARATUS

BACKGROUND OF THE INVENTION

1. Field of the Invention

The field of the invention relates to magnification readers, and more particularly pertains to a new and improved magnifier reader apparatus wherein the same permits magnification of lotto tickets and the like directed through a slot formed through the reader apparatus. A novel aspect of this apparatus is the magnification lens can be marked with a grease pen or the like to easily identify numbers drawn during any drawing held. After use, the lens may then be wiped clean and thus used again.

2. Description of the Prior Art

Reader apparatus of various types have been utilized in the prior art to enhance readability of various printed material and the like otherwise difficult to read. Prior art structure may be found in U.S. Pat. No. 1,264,267 to BUGBEE providing a magnifier wherein a generally U-shaped housing includes a convex lens mounted at an upper end thereof with a handle to permit the reader apparatus to be positionable about reading material.

U.S Pat. No. 1,886,747 to SCHRODER provides a folding magnifier wherein a lens is mounted to overlie a handle and pivotal relative to the handle to permit the magnifier to overlie various pages of sheet material and the like for magnification thereof.

U.S. Pat. No. 3,409,347 to VOGEL sets forth a pocket magnifier wherein the same provides a magnifier lens positionable within a sheath of the organization and removal therefrom for use.

U.S Pat. No. 2,682,805 to TOMASOVIC sets forth a magnifier and cleaning device wherein the lens is positionable within a housing including a cleaner organization to clean a small bellows in combination with the organization to effect a small blast of air or other cleaning material to a surface to be read.

As such, it may be appreciated that there continues to be a need for a new and improved magnifier reader apparatus wherein the same addresses both the problems of ease of use as well as effectiveness in construction in permitting ease of reading of various lotto tickets and the like and in this respect, the present invention substantially fulfills this need.

SUMMARY OF THE INVENTION

In view of the foregoing disadvantages inherent in the known types of magnifier reader apparatus present in the prior art, the present invention provides a new and improved magnifier reader apparatus wherein the same provides a housing defining a slot with a magnification lens along the slot to permit ease of reading of various material directed through the slot. As such, the general purpose of the present invention, which will be described subsequently in greater detail, is to provide a new and improved magnifier reader apparatus which has all the advantages of the prior art magnifier reader apparatus and none of the disadvantages.

To attain this, the magnifier reader apparatus of the invention includes a central housing plate with a floor plate mounted thereunder to define a slot therebetween. The housing plate includes an annular opening with a convex magnification lens mounted thereon to receive a lotto ticket through the slot permitting ease of reading of the lotto ticket. The invention may further include a plurality of straps positioned at forward and rear end portions about the housing plate to secure a stack of lotto tickets thereunder for storage and transport thereof.

There has thus been outlined, rather broadly, the more important features of the invention in order that the detailed description thereof that follows may be better understood, and in order that the present contribution to the art may be better appreciated.

It is therefore an object of the present invention to provide a new and improved magnifier reader apparatus which has all the advantages of the prior art magnifier reader apparatus and non of the disadvantages.

It is another object of the present invention to provide a new and improved magnifier reader apparatus which may be easily and efficiently manufactured and marketed.

It is a further object of the present invention to provide a new and improved magnifier reader apparatus which is of a durable and reliable construction.

An even further object of the present invention is to provide a new and improved magnifier reader apparatus which is susceptible of a low cost of manufacture with regard to both materials and labor, and which accordingly is then susceptible of low prices of sale to the consuming public, thereby making such magnifier reader apparatus economically available to the buying public.

Still yet another object of the present invention is to provide a new and improved magnifier reader apparatus which provides in the apparatuses and methods of the prior art some of the advantages thereof, while simultaneously overcoming some of the disadvantages normally associated therewith.

Still another object of the present invention is to provide a new and improved magnifier reader apparatus which may be compactly stored when not being utilized.

Yet another object of the present invention is to provide a new and improved magnifier reader apparatus wherein the same provides a slot to position and secure material to be magnified for ease of reading thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top orthographic view of the instant invention.

FIG. 4 is an orthographic view taken along the lines 4—4 of FIG. 3 in the direction indicated by the arrows.

FIG. 5 is an isometric illustration of the instant invention utilizing securement straps for storage and securement of a stack of lottery tickets mounted within the organization.

FIG. 6 is an isometric illustration of the instant invention with the straps securely mounting lotto tickets within the organization.

FIG. 7 is an isometric illustration of a modification of the instant invention.

FIG. 8 is an isometric illustration of the modification of the instant invention in cooperation with a book that will be read in combination with the apparatus permitting storage of the lotto tickets and simultaneous reading of the book to permit secondary usage of the organization.

DESCRIPTION OF THE PREFERRED EMBODIMENT

Figure 1:
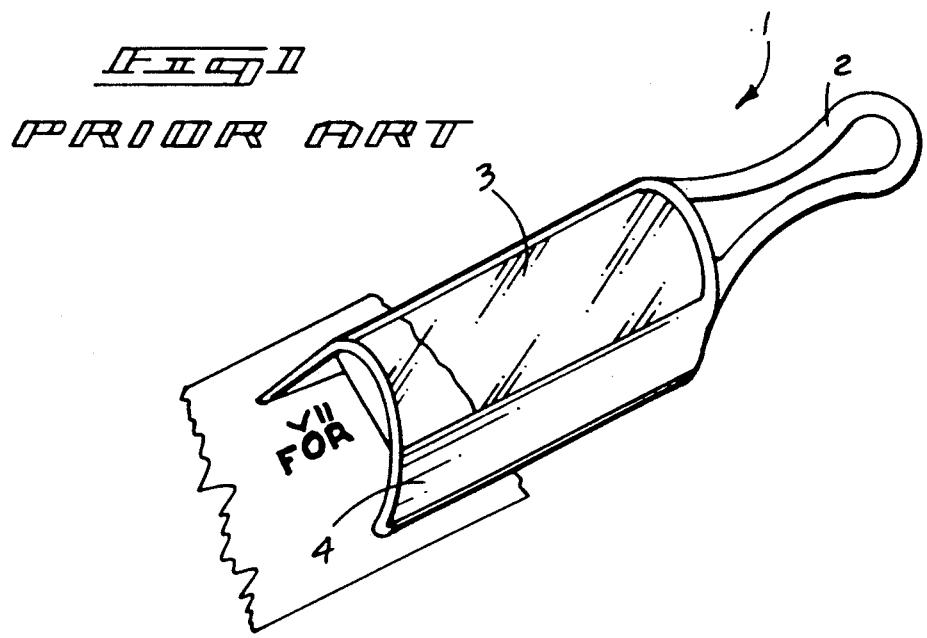
FIG. 1 is an isometric illustration of a prior art magnification reader apparatus.

With reference now to the drawings, and in particular to FIGS. 1 to 8 thereof, a new and improved magnifier reader apparatus embodying the principles and concepts of the present invention and generally designated by the reference numerals 10, and 10a will be described.

Figure 2:
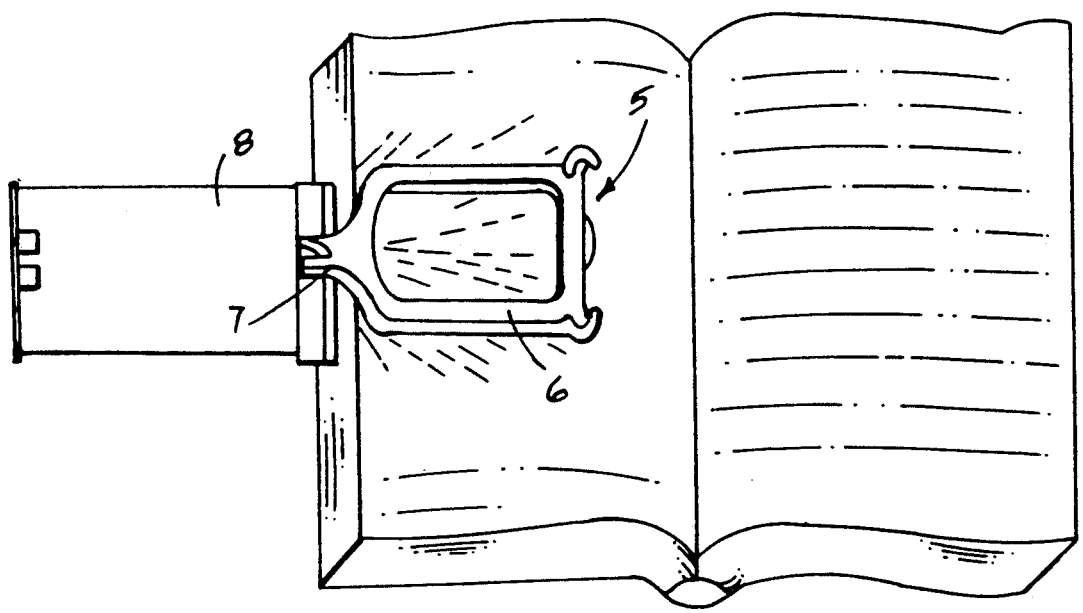
FIG. 2 is an isometric illustration of a further prior art magnification reader apparatus.

FIG. 1 illustrates a prior art magnifier reader apparatus 1 including a generally U-shaped elongate housing 4 with a handle 2 fixedly mounted to the housing including a convex lens 3 fixedly secured to an upper end of the housing to permit the housing to be positioned overlying various reading material. FIG. 2 illustrates a further prior art structure 5 wherein a support 8 includes a pivot hinge 7 to pivotally mount a magnifier reader 6 to selectively overlie the support 8 or various reading material as illustrated in FIG. 2.

More specifically, the magnifier reader apparatus 10 of the instant invention essentially comprises a central housing plate 11 including an annular opening 12 directed orthogonally and medially through the housing plate 11 with a convex magnification lens 13 surmounting the annular opening 12 on an upper surface of the housing plate 11. The housing plate 11 includes a forward side 17 and a rear side 18 spaced parallel from the forward side with a forward wall 15 orthogonally mounted to the housing plate 11 at the forward side thereof with a rear wall 16 mounted to the housing plate at the rear side 18 with the forward and rear walls 15 and 16 arranged parallel relative to one another. The forward and rear walls are defined by a predetermined ($d_{length\ 2}$) less than the length ($d_1$) defined by the housing plate 11 and is substantially equal to a predetermined diameter defined by the magnification lens 13 to permit alignment and securement of a lottery type ticket 14 directed through a slot 28 defined between the forward and rear walls 15 and 16 and a floor plate 19 fixedly mounted to bottom terminal edges of the forward and rear walls 15 and 16 and spaced parallel to and underlying the housing plate 11. For securement and positioning of a stack of lottery tickets 14a in a manner as illustrated in FIGS. 5 and 6, a first and second strap 20 and 21 respectively are positioned in surrounding relationship relative to the lottery ticket stack 14a and forward and rear respective portions of the housing plate 11 extending laterally beyond the walls 15 and 16 in a manner as illustrated in FIGS. 5 and 6. The first strap 20 includes a first strap first hook and loop fastener surface 22 cooperative with the first strap second hook and loop fastener surface 23 formed about opposed terminal end portions of the loop fastener surface 22 and the second strap 21 including a respective second strap first and second hook and loop fastener surface 23 and 24 to permit securement of the second strap 21 about the rear portion of the housing plate 11 to encompass a lottery stack 14a for transport and storage of the lottery stack where individuals purchase a predetermined quantity of lottery tickets to provide convenient storage and subsequent reading of each of the lottery tickets of the lottery stack 14a.

To permit a secondary usage of the magnification reader apparatus, a modified organization 10a includes the convex magnification lens 13 with a spring hinge 26 secured to the magnification lens 13 and the rear wall 16 to normally bias the magnification lens 13 against the housing plate 11 in a first position and permit lifting and positioning of the magnification lens 13 against a book member 27 or the like to permit enhanced reading thereof.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A magnifier reader apparatus comprising:
    a central housing plate of a generally parallelepiped configuration, the housing plate including a respective forward and rear side wherein the forward and rear sides are arranged parallel relative to one another and including a forward wall and a rear wall extending downwardly from the forward and rear sides respectively, where the forward and rear walls are each parallel relative to one another and the forward and rear walls are defined by a predetermined length, the housing plate forward and rear sides are defined by a further predetermined length where the predetermined length is less than that of the further predetermined length; and
    the central housing plate including a central opening positioned medially of the housing plate and including a magnification lens overlying the opening; and
    wherein the apparatus further includes a floor plate underlying the opening and parallel to the housing plate, said floor plate is orthogonally fixedly secured to the forward and rear walls to define a slot between the housing plate, the forward and rear walls, and the floor plate; and
    wherein the magnification lens is positioned above the slot to magnify a work piece directed through the slot; and wherein the housing plate extends forwardly and rearwardly of the slot, and including a first strap in surrounding relationship relative to the housing plate forwardly of the magnification lens, and a second strap in surrounding relationship relative tot he housing plate rearwardly of the magnification lens to permit securement of a stack of work pieces extending through the slot and the forward and rear portions of the housing plate.

2. Apparatus as set forth in claim 1 wherein the apparatus further includes a spring hinge means wherein the spring hinge means is secured to the rear side wall and to the magnification lens for biasing the magnification lens to overlie the opening in a first position and permit lifting of the magnification lens to a second position spaced from the housing plate to permit magnification of a work piece positionable upon an upper surface of the housing plate.

* * * * *